United States Patent

Guralp et al.

[11] Patent Number: 5,983,699
[45] Date of Patent: Nov. 16, 1999

[54] CLAMPING MECHANISM FOR INERTIAL PENDULUM INSTRUMENTS

[75] Inventors: Cansun Mustafa Guralp, Reading; Derek Roy Humphries, Basingstoke, both of United Kingdom

[73] Assignee: Guralp Systems Limited, Reading, United Kingdom

[21] Appl. No.: 08/945,670

[22] PCT Filed: May 3, 1996

[86] PCT No.: PCT/GB96/01057

§ 371 Date: Oct. 31, 1997

§ 102(e) Date: Oct. 31, 1997

[87] PCT Pub. No.: WO96/35132

PCT Pub. Date: Nov. 7, 1996

[30] Foreign Application Priority Data

May 4, 1995 [GB] United Kingdom .................. 9509089

[51] Int. Cl.⁶ .............................. G01V 1/18; H01H 35/14
[52] U.S. Cl. ........................ 72/652; 73/514.36; 367/179
[58] Field of Search .......................... 73/514.36, 514.37, 73/514.38, 652, 649, 651; 367/179; 177/154, 155, 168, 170

[56] References Cited

U.S. PATENT DOCUMENTS

| | | | |
|---|---|---|---|
| 2,536,870 | 1/1951 | Burmist ..................................... | 73/653 |
| 3,656,567 | 4/1972 | Knothe et al. . | |
| 3,713,088 | 1/1973 | Lehner et al. ............................ | 73/1.85 |
| 3,828,870 | 8/1974 | Schwarz . | |
| 4,189,945 | 2/1980 | Whiting ................................... | 73/652 |
| 4,280,206 | 7/1981 | Guralp .................................... | 73/652 |
| 4,368,637 | 1/1983 | Anderson ................................ | 73/652 |
| 4,630,483 | 12/1986 | Engdahl . | |

FOREIGN PATENT DOCUMENTS 2198130 3/1974 France .
496668 4/1930 Germany .

OTHER PUBLICATIONS

Vrashchenie I Prilivnye Deformatsii Zemli 1974, Ukrainan SSR, USSR P3–15 X P00 212384 Balenko et al: Horizontal Pendulum with Tselinerov Wire Suspension P6 Line 30–38 Fig 4+5.

Primary Examiner—Michael Brock
Assistant Examiner—Helen C. Kwok
Attorney, Agent, or Firm—Robert W. J. Usher

[57] ABSTRACT

An inverted pendulum seismometer mechanism has a massive boom (20) mounted in friction free crossed leaf spring pivot bearings (24) clamped in V grooves 28 on a frame (10). To lock the boom for transport, without straining the bearings, a camshaft (70) turns and, sequentially, cams (72) lift pivot clamping levers (30), guide webs (80) embrace the boom, and a cam (74) lifts the boom off the V grooves until probes (56) on adjustable locking screws (54) in the frame top cross beam (14) engage recesses (58) in the top end of the boom. Further rotation of the camshaft reverses the sequence to reconnect the boom to the frame in an operative state.

21 Claims, 3 Drawing Sheets

CLAMPING MECHANISM FOR INERTIAL PENDULUM INSTRUMENTS

FIELD OF THE INVENTION

This invention relates to seismometers and like instruments.

BACKGROUND OF THE INVENTION

The invention is particularly concerned with sensitive precision instruments of the kind in which a mass which is sufficiently great to constitute an inertial frame of reference is suspended so as to be free to move, by rotation or by translation, with respect to the instrument as a whole, so that motion of the instrument can be detected or measured. For ease of reference, such instruments as a class will be referred to herein as pendulum instruments. Pendulum instruments include accelerometers, velocimeters, displacement meters including inclinometers, gravity meters, and some kinds of inertial navigation instruments, as well as seismometers of the kind in which a mass is suspended in a frame which is intended in use to contact, and be moved by, the surface of the earth (or any other body whose seismic vibrations are to be measured). In principle, the vibrations cause the frame to move, and the mass is sufficiently freely suspended and sufficiently massive to form its own frame of reference, and the relative motion between the mass and the frame is detected and measured.

By limiting the degrees of freedom relative to the frame in which the mass can move, the seismometer can be set up to measure movement on one particular axis. This may be rectilinear motion, and this is approximated to in many pendulum-type seismometers by arcuate motion, when a long pendulum moves in a short arc.

In general, therefore, the invention is concerned with pendulum instruments in which a mass is prevented from moving in undesired directions, but is allowed to move as freely as possible in one or more other directions. The invention is specifically concerned with such instruments in which there is a mechanical linkage by which the mass is suspended and constrained with respect to the frame.

In instruments of this kind, the design of the suspension can be critical to the performance of the instrument. The suspension must be strong enough to reliably support the mass and prevent its movement in unwanted directions, yet be stable, smooth and substantially free of friction.

Given that the suspension must be resistant to movement of the mass off its intended axis, but compliant to movement of the mass in a direction in which the desired seismic disturbances are to be detected, and considering the magnitude of the mass involved and the desired sensitivity of the instrument, it is clearly desirable to provide means for locking the mass against movement with respect to the frame, so that the instrument can be transported and handled safely, without risk of damaging the delicate components. In practice, this poses problems, because it is extremely difficult to manufacture a locking mechanism that perfectly engages the mass without exerting unwanted stresses on the suspension. Indeed, it is common for suspension components to be stressed and ultimately to fracture after repeated locking and unlocking cycles.

SUMMARY OF THE INVENTION

It is an object of this invention to address this problem.

We have found that, rather than trying to solve this problem by ever more precise manufacturing, or strengthening the suspension, the problem can in fact be avoided.

According to the invention a pendulum instrument mechanism, and a method of locking it, comprise some or all of the elements and features disclosed in the following description. The scope of the invention extends to all novel aspects whether individually or in combination with other features as described herein.

More specifically, in one aspect of the invention a pendulum instrument mechanism of the kind comprising a mass connected to a frame by suspension means which constrains the mass to move substantially freely within a limited set of degrees of freedom comprises means for sequentially disengaging the mass from the frame at the suspension means, clamping the mass to the frame to lock the mechanism, unclamping the mass from the frame to unlock the mechanism, and re-engaging the mass with the frame through the suspension means.

Similarly, a method of locking and unlocking a pendulum instrument mechanism of the kind comprising a mass, a frame, and suspension means connecting mass and frame which constrains the mass to move substantially freely within a limited set of degrees of freedom comprises sequentially disengaging the mass from the frame at the suspension means, clamping the mass to the frame to lock the mechanism, unclamping the mass from the frame to unlock the mechanism, and re-engaging the mass with the frame through the suspension means.

In this way, by disengaging the suspension, which is a mechanical arrangement resistant to movement in a certain range of directions, or degrees of freedom, before clamping the mass with respect to the frame for transportation purposes, and by releasing the clamped mass before reconnecting it through the suspension mechanism, excessive stresses on the suspension caused by locking up the mass to the frame can be entirely avoided, and suspension strains and fractures due to this cause can be eliminated.

The mass referred to above comprises all that inertial body that moves, in the seismometer, with respect to the frame, and not specifically the massive weight in which the mass is largely concentrated. Thus, in a pendulum-type instrument in which a weight is carried on a pivoted boom, the mass referred to above can be considered to be the whole of the weighted boom, and in accordance with the invention it is of course this component that is the mass that is connected by a pivoted suspension means to the frame, and locked to the frame for transport.

Disengaging the mass from the frame at the suspension means may take place in two stages; firstly, releasing the connection, and secondly, separating the mass from the frame by movement away from the suspension point. Similarly, re-engaging the mass to the frame may comprise initially bringing the mass and the frame together again at the suspension point, followed by positively reconnecting the mass and the frame through the suspension means.

Guide means may be associated with the separation step to aid the proper clamping of the mass to the frame during the locking step, and the proper re-engagement of the mass with the frame at the reconnection of the suspension means. Such guide means may be advanced prior to the completion of the disengagement of the mass from the frame at the suspension means, and optionally prior to the initial disconnection, and may be withdrawn after the relocation of the mass with respect to the frame at the suspension means, and optionally not until after their positive reconnection.

BRIEF DESCRIPTION OF THE DRAWINGS

One embodiment of the invention is shown by way of example in the accompanying drawings, in which.

DETAILED DESCRIPTION OF THE INVENTION

Figure 1:
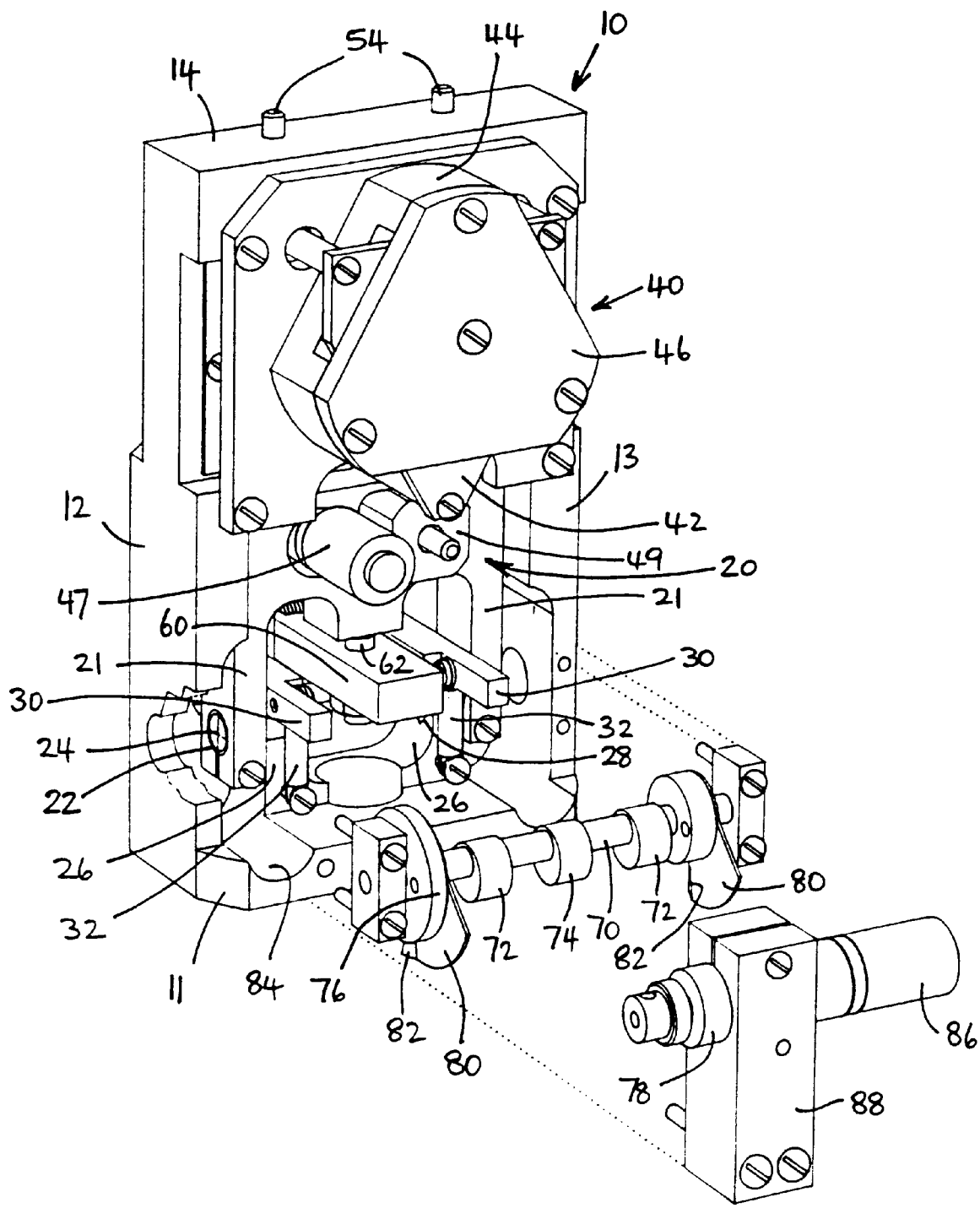
FIG. 1 is an isometric front view of a seismometer mechanism, to a small degree cut away and exploded for the sake of clarity.
Figure 2:
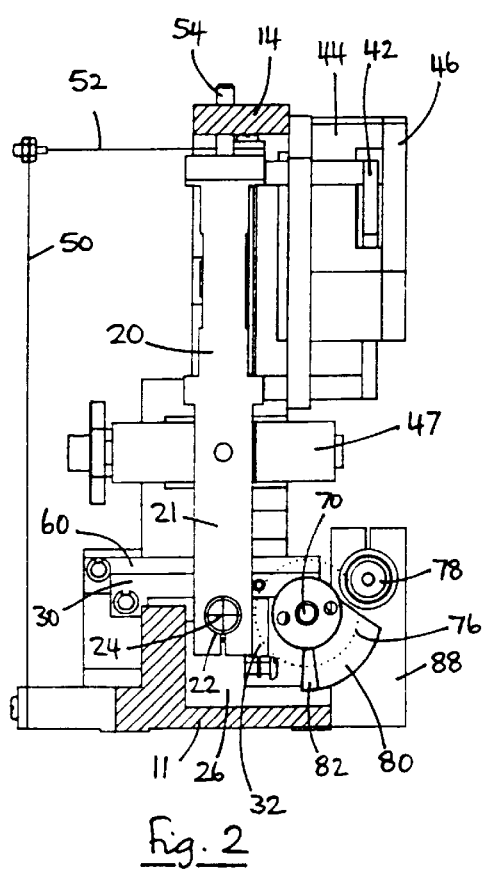
FIG. 2 is a vertical cross-section through the mechanism shown in FIG. 1, looking inwardly from just inside the left hand frame upright, the mechanism being shown unlocked.
Figure 3:
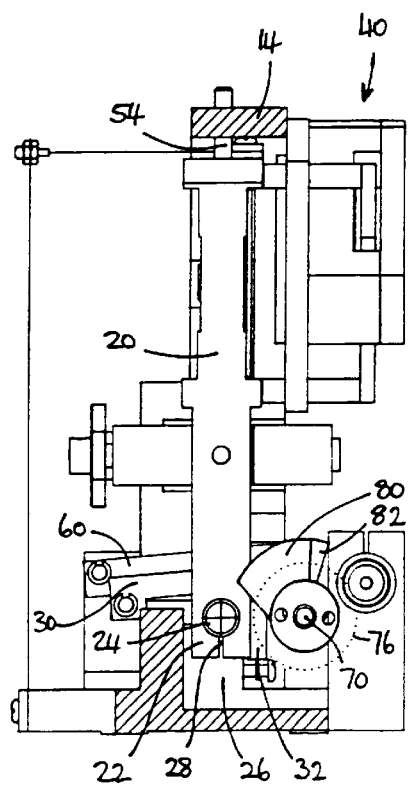
FIG. 3 is a view corresponding to that of FIG. 2, but the mechanism being shown locked.
Figure 4:
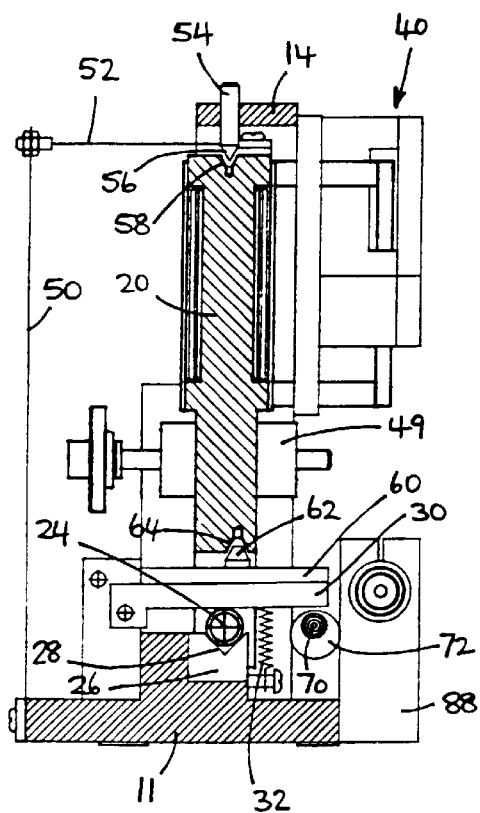
FIG. 4 is a cross-sectional view similar to that of FIG. 2, but taken closer to the centre line of the instrument, the mechanism being shown unlocked.
Figure 5:
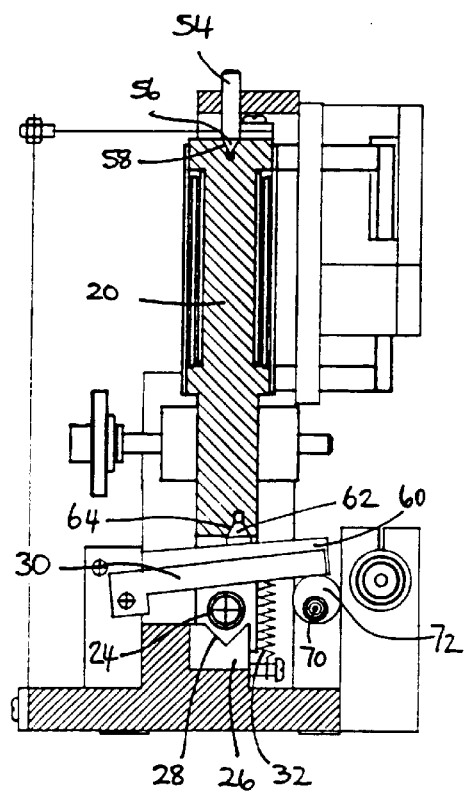
FIG. 5 is a cross-section taken at the same location as FIG. 4, but the mechanism being shown locked.

It will be appreciated that the mechanism shown in the drawings will normally be housed in an outer canister, and will contain in particular a substantial quantity of electronics control and measuring components, which may be entirely conventional in nature. These have therefore been omitted as unnecessary to the understanding of the present invention.

The mechanism shown in the drawings is for a seismometer of the inverted pendulum kind, in which a mass is supported on a pivot over a base. The instrument will detect vibrations in a horizontal direction perpendicular to the horizontal pivot axis.

Specifically, the frame 10 of the mechanism includes a base 11, a left hand upright 12, a right hand upright 13 and a top cross beam 14. The mass comprises a boom 20 and all its associated fittings, as described below.

The boom is a solid body, generally rectangular in shape, fitting inside the upper part of the frame 10, and provided at each side with two downwardly extending legs 21. Towards the bottom of each leg are cylindrical pivot clamps 22, each of which holds a boom mounting pivot 24.

The boom mounting pivots are each formed of leaf springs set in two mutually perpendicular planes. Adjacent pairs of ends of the leaf springs are linked together by part-cylindrical shells, so the two shells form components that can hinge with respect to each other about the line on which the leaf springs cross each other. The two opposed part-cylindrical shells are contained within two axially aligned cylindrical rings, one end of one shell being made fast to one ring and the opposite end of the other shell being made fast to the other ring. In this way, the pivot axis is the line on which the two leaf spring planes intersect, which is the central axis of the two adjacent cylindrical rings, and the ring on one side can rotate about this axis with respect to the other ring, in a smooth and substantially friction free manner. Pivots of this kind are well known in the art, and include "Free-Flex" pivots manufactured by the Bendix Fluid Power Division of Allied Bendix Aerospace.

It is accordingly one of the cylindrical rings of the pivot that is clamped in each boom leg, and the adjacent cylindrical ring projects freely on the inner side of the respective leg 21, towards and aligned with the opposite pivot 24.

The base 11 of the seismometer frame includes a pair of pivot mounting blocks 26, each of which is provided with a pivot-receiving V groove 28 on its top surface. These V grooves are aligned with each other and are so positioned as to provide supports for the inner rings of the boom pivots 24.

The pivots are retained in the V grooves by two respective pivot clamp levers 30, which are themselves pivotally mounted to the frame at one end (the rear of the mechanism as seen in FIG. 1), and are pulled downwardly over the pivot 24 by respective pivot clamp lever return springs 32 which are anchored to the front of the pivot mounting block. It can be seen, therefore, that the massive boom 20 is connected to the frame 10 by suspension means including the pivots 24 which constrain the boom to move solely by rotation on the one pivot axis in the frame, and that the massive boom is engaged with the frame by the pressure of the pivot clamp levers over the pivot rings resting in the pivot receiving V grooves of the pivot mounting block on the frame.

As regards the mass comprising the boom 20 and its associated fittings, these fittings include a movement detector 40, which is of the capacitative displacement transducer type with magnetic servo feedback, and includes a coil former 42 rigidly mounted off the front face of the top of the boom 20. The coil former lies between, but spaced from, a magnet 44 and a keeper 46 rigidly fixed to the top cross beam 14 and to the upper ends of the uprights 12, 13 of the frame 10. The boom also carries, below the detector, a centering motor 47 and adjustment weight assembly 49, which are used in a conventional manner to make fine adjustments to the centre of gravity of the boom.

The inverted pendulum constituted by the massive pivoted boom assembly must be stabilised, so that it is upright in its rest position, and this is accomplished, again in a conventional manner, by means of a long narrow stabilising leaf spring 50 which is clamped upright to the rear edge of the base 11 and carries at its upper end, at the height of the top of the boom, a horizontal stabilising wire 52 which extends towards the top of the boom, where it is clamped. The stabilising wire 52 is axially stiff, but compliant as regards vertical movement of one end with respect to the other.

The top cross beam 14 of the frame includes two laterally spaced upper boom locking screws passing therethrough, which terminate at their lower tips in conical probes 56. The top edge of the boom 20 is provided with corresponding conical recesses 58 below the respective probes 56. The intention is that the boom will be locked by lifting it, as will be described, so that the probes firmly engage the recesses, and unlocked by lowering it so that the probes and recesses separate and once again allow adequate free motion of the boom.

The direct means of lifting the boom comprises boom locking lever 60, which is pivotally mounted at the centre rear of the mechanism and passes forwardly, between the legs 21 of the boom, and between the two pivot clamping levers 30. The upper surface of the locking lever 60 carries a boom locking stud 62, which has a frustoconical nose, and a corresponding conical recess 64 is formed immediately above it in the lower edge of the upper part of the boom. Subject to disengagement of the boom from the frame at the pivots, it can be seen that if boom locking lever 60 can be raised, boom locking stud 62 will engage the recess 64 and then lift the boom until recesses 58 on the upper edge engage the conical probes 56, by means of which three points of engagement the boom can be clamped in the frame by means of upward pressure on the boom locking lever.

Releasing the suspension and clamping the boom, and the reverse process, is carried out and controlled by means of cams on a camshaft 70 mounted on the front of the mechanism below the front ends of the pivot clamp levers 30 and boom locking lever 60. There are two cams 72 for actuating the pivot clamp levers, and a central cam 74 for actuating the boom locking lever. The camshaft has a drive gear pinion 76 on its left hand end, which is engaged by motor drive pinion 78 of camshaft motor 86 which is mounted on the front of the mechanism in mounting block 88.

Boom locking lever cam 74 is of substantially the same profile as pivot clamp lever cams 72, but the boom locking lever 60 is slightly higher in the frame than the pivot clamp levers, so that, as the camshaft rotates, the pivot clamp levers are lifted by the cams 72 before the boom locking lever 60 is lifted by the cam 74. This means that the pivot connection in the suspension is released, by raising the pivot clamp levers against the tension of their return springs 32, before the boom locking lever starts to lift the boom; and when it does so, the inner pivot rings are lifted from the pivot-receiving V grooves 28 to complete the suspension disengagement by separating the massive boom entirely from the frame. Further rotation of the camshaft continues to lift the respective levers, and ultimately the boom is firmly clamped against the conical probe tips of the upper locking screws 54. It will be appreciated that there is absolutely no stress on the suspension in this locked condition. To unlock the mechanism, camshaft 70 is further rotated by the motor 86, the boom locking lever 60 is allowed to fall under the weight of the boom, and additionally the tension in the suspension clamp lever return springs 32 draws the pivot clamp levers 30 down above the pivot rings until the pivots 24 are restored to their proper positions on the pivot-receiving V grooves 28, where they are thereafter positively held by increasing return spring tension as the cams 72 separate entirely from the clamp levers 30.

It will be appreciated that the pivot clamp lever cams 72 could in principle be eliminated, if the pivot clamp lever return springs were not so strong as to damage the pivots in any way when the boom was raised by the boom locking lever. The mass would be effectively disengaged from the frame when subject only to weak return spring tension. However, it is generally preferred to eliminate all forces acting between mass and frame at the pivot, as illustrated, or other suspension point.

Camshaft 70 is also provided with two boom guide webs 80, at locations which correspond to the position of the outside faces of boom legs 21, inside the frame uprights 12, 13. The guide webs rotate with the camshaft, and are provided with outwardly angled leading edges 82. The webs are sufficiently thin that they are somewhat resilient as regards outward lateral pressure, and the arrangement is such that as the camshaft rotates the tapered leading edges of the webs touch and then pass outside the legs 21, and the following flat faces of the webs embrace the legs 21 under slight pressure. The purpose of this arrangement is to guide the boom during its locking and unlocking cycle, resisting sideways movements and aiding the proper clamping of the massive boom to the frame during the locking step, and the proper re-engagement of the boom with the frame when the pivots are re-engaged with the pivot-receiving V grooves.

The guide webs 80 have substantially the shape of a sector of a circle, so that their leading edges 82 can be advanced to the boom just prior to the initial lifting of pivot clamping levers 30, remain in contact with the boom during the whole of the locking and unlocking operations, and release the boom after the pivots have been clamped in their V grooves. Clearance grooves 84 are provided in the base 11 of frame 10 to accommodate the guide webs.

It will be noted that when the suspension is disengaged, and before the boom is locked, the boom remains connected to the frame through the stabilising spring 50 and wire 52, but these do of course undergo no permanent strain and form no part of the suspension means in accordance with the invention. The invention is not concerned with such effectively compliant connections, but with partially stiff suspension systems, in which a mass is constrained to move substantially freely in a limited set of degrees of freedom, and most commonly in a single degree of freedom, in this particular embodiment an arc which, if it is short enough compared to its radius, approaches rectilinear motion.

Although the embodiment of the invention that has been described with reference to the drawings is a seismometer mechanism designed to respond to horizontal motions, the principle can be easily adapted to instruments for measuring vertical displacements. For example, the boom can be held horizontal by means of a torsion spring applied at the pivots, and the centering operation would be carried out not by shifting the centre of gravity of the boom but by adjusting the tension of the torsion spring. The invention can also be applied to other pendulum instruments of the kind described, as well as to seismometers.

Further, the invention is applicable to other forms of suspension, and is not limited to pivots mounted in releasable clamping blocks.

We claim:

1. An inertial pendulum instrument mechanism of the kind comprising an inertial mass connected to a frame for detecting and measuring changes in the motion of the frame by detecting and measuring relative movement between the inertial mass and the frame, and including suspension means for suspending the mass on the frame and by which the mass is positively connected to the frame the suspension means allowing the mass to move substantially freely relative to the frame within a limited set of degrees of freedom but otherwise preventing the mass from moving relative to the frame; the instrument comprising means for sequentially releasing the positive connection between the mass and the frame at the suspension means, separating the released mass from the frame by relative movement apart at the suspension means, clamping the mass to the frame at a location spaced apart from the suspension means to lock the mechanism, unclapping the mass from the frame to unlock the mechanism, and re-establishing the connection between the mass and the frame through the suspension means.

2. An inertial pendulum instrument mechanism according to claim 1 wherein the means for re-establishing the connection between the mass and the frame comprises means for bringing the mass and the frame together at the suspension means, and for then positively reconnecting the mass and the frame through the suspension means.

3. An inertial pendulum instrument mechanism according to claim 2 wherein the mass comprises a weighted boom positively connected to the frame by the suspension means which is pivotal and provided with a releasable clamp.

4. An inertial pendulum instrument mechanism according to claim 3 wherein the mass comprises a weighted boom positively connected to the frame by a pivotal suspension means comprising crossed leaf springs defining a pivot axis on the line on which the springs cross.

5. An inertial pendulum instrument mechanism according to claim 2 wherein the suspension means which connects the mass to the frame comprises a pivot axis positively but releasably retained in a pivot-receiving groove.

6. An inertial pendulum instrument mechanism according to claim 5 wherein the pivot is positively but releasably retained in the groove by a pivot clamp urged over the pivot by a spring.

7. An inertial pendulum instrument mechanism according to claim 6 comprising a cam acting on the pivot clamp whereby to release the pivot from the pivot-receiving groove.

8. An inertial pendulum instrument mechanism according to claim 5 comprising a cam adapted to separate the pivot from the groove.

9. An inertial pendulum instrument mechanism according to claim 5 comprising a cam adapted to clamp the mass to the frame.

10. An inertial pendulum instrument mechanism according to claim 7 wherein the said cam acting on the pivot clamp is mounted on a common camshaft with a cam adapted to separate the pivot from the groove and a cam adapted to clamp the mass to the frame.

11. An inertial pendulum instrument mechanism according to claim 1 comprising means for guiding the mass during its separation from the frame.

12. An inertial pendulum instrument mechanism according to claim 10 comprising means for guiding the mass during its separation from the frame, said means for guiding the mass comprising two guide webs each substantially the shape of a sector of a circle which rotate with the camshaft, such that as the camshaft rotates the webs embrace the mass to guide the mass while it is separated from the frame.

13. An inertial pendulum instrument mechanism according to claim 1 wherein the frame and the mass are each provided with at least one of a locking probe and a corresponding recess, whereby the mass may be clamped to the frame by the probe engaging the recess, and unclamped by separating the probe from the recess.

14. A seismometer provided with the inertial pendulum instrument mechanism according to claim 1.

15. A seismometer according to claim 14, wherein the mechanism is of the inverted pendulum kind.

16. A method of locking and unlocking an inertial pendulum instrument mechanism of the kind comprising an inertial mass connected to a frame for detecting and measuring changes in the motion of the frame by detecting and measuring relative movement between the inertial mass and the frame, and including suspension mean for suspending the mass on the frame and by which the mass is positively connected to the frame, the suspension means allowing the mass to move substantially freely relative to the frame within a limited set of degrees of freedom but otherwise preventing the mass from moving relative to the frame; comprising the steps of sequentially releasing the positive connection between the mass and the frame at the suspension means, separating the released mass from the frame by relative movement apart at the suspension means, clamping the mass to the frame at a location spaced apart from the suspension means to lock the mechanism, unclamping the mass from the frame to unlock the mechanism, and re-establishing the connection between the mass and the frame through the suspension means.

17. A method according to claim 16 wherein the step of re-establishing the connection between the mass and the frame comprises bringing the mass and the frame together at the suspension means, followed by positively reconnecting the mass and the frame through the suspension means.

18. A method according to claim 16 wherein the suspension means comprises a clamped pivot connection between the mass and the frame, and the releasing step includes unclamping the pivot, and the re-establishing step includes reclamping the pivot.

19. A method according to claim 16 comprising guiding the mass during its separation from the frame.

20. A method according to claim 16 wherein the mechanism is a seismometer mechanism.

21. An inertial pendulum acceleration detector comprising:

a frame;

an inertial mass;

suspension members on the mass and on the frame, engagable to suspend the inertial mass on the frame in a first, operational, position permitting continuous limited relative movement between the frame and the inertial mass in response to acceleration of the frame;

releasable confining means for confining the suspension members in engagement in the first position, means for attaching the inertial mass to the frame in a second, inoperative, position of engagement, spaced apart from the first operational position of engagement with the suspension members disengaged, preventing relative movement between the frame and inertial mass; and, moving means on the frame for moving the inertial mass between the first operable, position of engagement and the second inoperable, position of engagement, the moving means including means for engaging the confining means to effect release thereof thereby to permit subsequent movement of the inertial mass, by the moving means, from the first position of engagement to the second position of engagement.

* * * * *